United States Patent [19]

Thompson

[11] Patent Number: 4,460,555
[45] Date of Patent: Jul. 17, 1984

[54] AMMONIA SCAVENGER

[75] Inventor: Ralph P. Thompson, Oklahoma City, Okla.

[73] Assignee: Organon Teknika Corporation, Oklahoma City, Okla.

[21] Appl. No.: 526,311

[22] Filed: Aug. 25, 1983

[51] Int. Cl.$^3$ .............................................. C01B 25/26
[52] U.S. Cl. .................................... 423/309; 210/638; 210/681; 423/308; 423/356
[58] Field of Search ................ 423/308, 309, 310, 311, 423/356

[56] References Cited

U.S. PATENT DOCUMENTS

| | | | |
|---|---|---|---|
| 1,251,742 | 1/1918 | Blumenberg | 423/312 |
| 1,816,051 | 7/1931 | Lloyd . | |
| 2,036,760 | 4/1936 | Knox | 23/109 |
| 2,121,208 | 6/1938 | Milligan | 23/109 |
| 3,294,486 | 12/1966 | Cremer et al. | 423/309 |
| 3,495,988 | 2/1970 | Balassa | 99/71 |
| 3,669,878 | 6/1972 | Marantz et al. | 210/22 |
| 3,669,880 | 6/1972 | Marantz et al. | 210/22 |
| 3,697,410 | 10/1972 | Johnson et al. | 204/301 |
| 3,697,418 | 10/1972 | Johnson | 210/22 |
| 3,703,959 | 11/1972 | Raymond | 210/87 |
| 3,723,308 | 3/1973 | Breck | 210/681 |
| 3,850,835 | 11/1974 | Marantz et al. | 252/182 |
| 3,989,622 | 11/1976 | Marantz et al. | 210/645 |
| 3,989,625 | 11/1976 | Mason | 210/94 |
| 4,205,060 | 5/1980 | Monsimer et al. | 424/14 |
| 4,218,541 | 8/1980 | Ackerman | 210/903 |
| 4,247,393 | 1/1981 | Wallace | 210/638 |
| 4,256,718 | 3/1981 | McArthur et al. | 423/419 P |
| 4,294,808 | 10/1981 | Wasel-Nielen et al. | 423/305 |
| 4,344,851 | 8/1982 | Sherman et al. | 210/681 |
| 4,344,857 | 8/1982 | Shasha et al. | 252/316 |
| 4,360,507 | 11/1982 | McArthur et al. | 423/419 P |
| 4,392,963 | 7/1983 | Perl et al. | 210/692 |

FOREIGN PATENT DOCUMENTS

| | | | |
|---|---|---|---|
| 675741 | 5/1966 | Belgium | 113/23 |
| 704951 | 3/1965 | Canada | 110/23 |
| 964205 | 3/1975 | Canada . | |
| 982060 | 1/1976 | Canada . | |
| 1224716 | 9/1966 | Fed. Rep. of Germany | 110/73 |
| J56/88812 | 7/1981 | Japan | 423/307 |
| J56/1611886 | 12/1981 | Japan | 423/312 |
| J57/12892 | 1/1982 | Japan | 423/312 |
| 896660 | 5/1962 | United Kingdom | 59/231 |
| 173206 | 7/1965 | U.S.S.R. | 423/113 |

OTHER PUBLICATIONS

Kirk-Othmer, *Encyclopedia of Chemical Technology*, Third Edition, vol. 17, (1982), John Wiley & Sons, pp. 426-428, 444-447.

C. Kjellstrand et al., "On the Clinical Use of Microencapsulated Zirconium Phosphate-Urease for the Treatment of Chronic Uremia", Trans. Am. Soc. Artif. Intern. Organs 27 at 24-29, (1981).

V. I. Valoven et al., "Effect of Temperature and the Concentration of Hydrogen Ions on the Phase Composition and Rate of Reciprocal Transformations of Magnesium Phosphates in the Magnesium Oxide-Phosphorus Pentoxide-Sulphur Trioxide-Ammonia-Water System", Zh. Prikl. Khim. (Leningrad) (ZPKHAB) 54(1) at 155-157, (1981).

A. William Frazier et al., "Solubilities in the System Magnesium Oxide-Ammonia-Orthophosphoric Acid-Pyrophosphoric Acid at 25° C.", J. Agric. Food Chem. 29 at 160-162, (1981).

V. V. Vyazovov et al., "The Influence of Temperature on the Synthesis of Magnesium Ammonium Phosphate", Zh. Neors. Khim. (ZNOKAQ) 25(8) at 2164-2167, (1980).

Natalie S. Cohen et al., "The Apparent $K_m$ of ATPMg for Carbamyl Phosphate Synthetase (Ammonia) *in Situ*", J. Biol. Chem. 255(8) at 3352-3357, (1980).

I. G. Kel'man et al., "Influence of the Temperature of Preparation of Ammonium Magnesium Phosphate on its Hydrate Composition and Therman Stability", Zh. Neors. Khim. (ZNOKAQ) 23 (11) at 3134-3136, (1978).

I. A. Borukov et al., "Thermal Dehydration of an Equimolar Mixture of Magnesium Dihydrogen Phosphate Dihydrate and Urea", Uzb. Khim. Zh. (UZKZAC) 3 at 23-27, (1980).

H. Thieler et al., "Usefulness of Dialysates for Laboratory Analyses for Monitoring Continuous Peritoneal Dialysis (CAPD)", Dtsch. Gesundheitswes (DE-GEA3), 34 (15) at 713-714, (1979).

E. D. Pellegrino et al., "Inter-Relationships of Carbonate, Phosphate, Monohydrogen Phosphate, Calcium, Magnesium, and Sodium in Uraemic Bone: Comparison of Dialysed and Non-Dialysed Patients", Clin. Sci. Mol. Med. (CSMMCA) 53(4) at 307-316, (1977).

M. Kinoshita et al., "Effect of Magnesium Diphosphate and Zirconium Diphosphate Additions on Sintering of Magnesium Oxide", Yogyo Kyokaishi (YGKSA4) 88(7) at 388-394, (1980).

V. Giancotti et al., "Separation, Spectroscopic Analysis and Non-Specific Biological Characterization of Dialysates from Human Leukocytes", Folia Allergol, Immunol. Clin. 27 at 435-446, (1980).

R. W. Stieber et al., "Dialysis Continuous Process for Ammonium Lactate Fermentation: Simulated and Experimental Dialysate-Feed, Immobilized Cell Systems", Biotech. and Bioengr. 23 at 535-549, (1981).

N. G. De Santo et al., "Kinetics of Amino Acids Equilibrium in the Dialysate During CAPD", Int. J. of Art. Organs, 4(1) at 23-30, (1981).

B. M. Beglov et al., "Interaction of Magnesium Polyphosphate with Urea Nitrate", Uzb. Khim. Zh. (UZKZAC) 3 at 14-18, (1981).

G. P. Shkrobot et al., "Magnesium Sulphate-Cobalt Sulphate-Urea Water System at 20 and 25 Degrees", Zh. Neors. Khim. (ZNOKAQ) 26(4) at 1115-1117, (1981).

H. K. Beyer et al., "Determination of the Concentration of Thyroid Hormone in Dialysate and Assessment of the Loss of Thyroid Hormone During Hemodialysis", Nuklearmedizin (Stuttgart) (NMIMAX) 19 (6) at 288-293, (1980).

Thomas G. Parker et al., "Factors Influencing the Stability of Milk Dialysate", J. Dairy Reser. 47 at 337-342, (1980).

I. A. Boruknov et al., "Thermal Dehydration of an Equimolar Mixture of Magnesium Hydrogen Phosphate Trihydrate and Urea", Uzh. Khim. Zh. (UZKZAC) 2 at 19-23, (1981).

Kenji Maeda et al., "Sorbent Use in Dialysis", from Sorbents and Their Clinical Applications, (Academic Press, New York) at 295-332, (1980).

J. R. Salaman et al., "Inhibition of the Mixed Lymphocyte Reaction by Fractionated Niridazole Urine Dialysis", J. Immunol. 125(2) at 956, (1980).

T. S. Ing et al., "Delivering Dialysate of Constantly Decreasing Sodium Concentration Using an Automated Dialysate Delivery Machine", Int. J. Artif. Organs (IJAODS) 3(2) at 124, (1980).

*Primary Examiner*—John Doll
*Assistant Examiner*—Wayne A. Langel
*Attorney, Agent, or Firm*—David M. Carter; Charles A. Wendel; Francis W. Young

[57] ABSTRACT

A process for making particulate substantially water-insoluble magnesium phosphate product and method of use of the product for removing ammonia from aqueous solutions. The particulate magnesium phosphate product acts as a remarkably effective scavenger wherein under equilibrium conditions only about six (6) grams of the product are required to bind the ammonia (more exactly, ammonium ions) liberated from one (1) gram of the urea, a result far superior to traditional zirconium phosphate (ZP) prior art materials which under ideal conditions require about 17 to 20 grams of ZP per gram of urea. The particulate magnesium phosphate product can also be used for the removal of ammonium ions either produced by enzymatic or non-enzymatic hydrolysis of urea or proteins or amino acids or available as $NH_4^+$ from its native source. The magnesium phosphate product is made by forming a slurry of water and magnesium hydroxide in the presence of a phosphate ion-containing buffer having a pH of about 6.5 to about 8.5 and reacting the slurry with $H_3PO_4$.

18 Claims, No Drawings

4,460,555

AMMONIA SCAVENGER

REFERENCE TO RELATED APPLICATION

This application is related to application Ser. No. 416,771 filed Sept. 9, 1982 in the names of Robert B. Polak and Craig R. Hof.

BACKGROUND OF THE INVENTION

1. Field of the Invention

The subject matter of this application relates to the preparation of magnesium phosphates (MGP) and their exploitation in the medical field, to-wit, their use in systems having the purpose of removing urea/ammonia from body fluids and in waste water treatment to remove ammonium ions ($NH_4+$).

2. Description of the Prior Art and Other Information

Urea is present in the intestinal contents and other body fluids of normal as well as uremic patients. Uremia is a clinical term describing the condition in which the level of urea in a patient is elevated above the normal levels of about 20 to about 40 milligrams per deciliter (mg/dl). Uremia is due to the nephron function being inadequate to excrete the urea generated by protein metabolism.

Excess urea can be removed by: (1) mass transfer across a membrane from blood to another urea content fluid as in hemodialysis; (2) mass transfer across the membranes of the peritoneum into a low urea content fluid as in peritoneal dialysis; or (3) by strongly absorbing urea or its hydrolysis products, especially ammonia, from the intestinal tract. See Kjellstrand, infra.

In the last several decades, systems have been developed to treat people who might otherwise die of kidney failure due to the inability of the kidney to remove metabolites, e.g., urea/ammonia from body tissues and organs. By the removal of "urea/ammonia from body tissues and organs" is meant more precisely the removal of ammonium ions from solution, the source of these $NH_4+$ ions being the hydrolysis of urea, either catalyzed by an exogenous urease enzyme such as jack bean meal urease or by an endogenous urease or by non-catalyzed hydrolysis of urea. Also, $NH_4+$ is produced by bacterial activity in the intestine. Normally, this $NH_4+$ is converted to urea by the liver. Thus, by removing $NH_4+$ which is or is not the product of urease catalyzed hydrolysis of urea, the net effect is to reduce the amount of urea which would have to be removed by other means.

Over a period of time, variations on these basic methods of removing urea have been made. In the field of hemodialysis, artificial kidneys were developed following the initial disclosure of the first suggestion for an effective mass transfer exchanger to treat a patient's blood through mass exchange with a treating solution. See Mahon, U.S. Pat. Nos. 3,228,886 and 3,228,887.

Commencing with the pioneer invention of Marantz and co-workers of a recirculation dialysate system for use with artificial kidney machines, U.S. Pat. No. 3,669,880, much investigation and development has ensued in the marketing of various portable systems whereby artificial kidneys can be employed at locations other than the hospital in order to reduce the cost and increase convenience to the patients. See U.S. Pat. Nos. 3,697,410; 3,697,418; 3,703,959; 3,850,835; 3,989,622; 4,164,437; 4,212,738; and 4,256,718. Presently, such an advanced recirculation dialysate system for use with artificial kidneys is marketed under the trademark REDY TM by Organon Teknika Corporation of Oklahoma City, Okla. Following the disclosure of U.S. Pat. No. 3,332,737 to Kraus, much study has been made toward the development of materials suitable for removing metabolites, e.g., urea/ammonia from the blood and from various body tissues and organs. Early on, it was discovered that zirconium phosphate was effective for removing these metabolites. See U.S. Pat. No. 3,669,880, Column 2, lines 54–67. Of course, zirconium phosphate was old at the time of the U.S. Pat. No. 3,669,880 invention. F. Hevesey and K. Kimura, J. AM. CHEM. SOC., 47 at 2540, et seq., (1925) examined zirconium and hafnium phosphates looking for ways to separate them, and methods of preparation and solubility were examined. R. Ried and J. Withrow, J. AM. CHEM. SOC., 51 at 1311 (1929) did an extensive study on methods of quantitatively precipitating zirconium phosphate using various phosphate mixtures. Chemical abstracts list several references to zirconium-hafnium separations employing phosphates. Note Z. ANORG. ALLGEM. CHEM., 165 at 1–15, 21–30 (1927), U.S. Pat. No. 1,636,493 and Dutch Pat. Nos. 16,508; 16,510; 16,955, and 16,956.

The progeny of the U.S. Pat. No. 3,669,880 discloses much investigation toward the preparation of various zirconium hydrous oxide ion exchangers comprising amorphous or microcrystalline solids containing zirconium or zirconium plus other oxides or hydroxides in various amounts of water. In addition, the recirculating dialysis systems utilize disposable cartridges containing layers of urease and ZP separate from other layers of aluminum oxide and magnesium silicate. See U.S. Pat. No. 3,989,622 and FIG. 1 therein.

In the above cited art, U.S. Pat. No. 3,669,880, etc., ZP has been used as the preferred ammonia absorbant.

A very recent development to the gastrointestinal approach utilizes an enzyme urease from jack beans, encapsulated along with an ammonia absorber, ZP. The capsules are swallowed by the uremic patient and act to remove urea as ammonia. The removal of urea is completed when the capsules are voided in the patient's stools. This treatment, while not a complete replacement for dialysis, is useful to postpone the onset or reduce the number of expensive and debilitating extracorporeal treatments. See Carl M. Kjellstrand et al., "On the Clinical Use of Microencapsulated Zirconium Phosphate-Urease, the Treatment of Chronic Uremia", TRANS. AMER. SOC. ARTIF. INT. ORGANS 27 at 24–29, (1981) and the pioneering microencapsulation work of Gardner and coworkers at Battelle Memorial Institute, Columbus, Ohio, in articles cited therein. In these articles, ZP is again the ammonia absorber of choice.

3. The problems Associated with Zirconium Phosphate and Replacing It

In 1981, and at the time of this invention, more than 56,000 Americans were being kept alive by maintenance peritoneal dialysis or hemodialysis at an annual expenditure of over $1.2 billion. Because of its extraordinary cost, however, three out of four people around the world will have no chance of receiving contemporary uremia therapy should their kidneys fail. Health planners in developed countries, distressed by the advancing expense of uremia therapy, are exploring shortened, more efficient hemodialysis and/or the potential benefits of Continuous Ambulatory Peritoneal Dialysis (CAPD) to contain costs. Also, to reduce the volume and cost of dialysate fluid and to improve the mobility of hemodialysis equipment, recirculating dialysate systems have been introduced and are being used by uremic patients.

Unfortunately, however, all of these recirculation-looped, artificial kidney hemodialysis systems rely on the use of zirconium phosphate—a relatively expensive material whose precursors are only available from a few sources in the world, e.g., the Union of Soviet Socialist Republics and the Union of South Africa—presenting supply difficulties. In addition, because of its relative ineffectiveness in removing ammonia/urea from dialysis solutions and body cavities, i.e., because of its non-specificity and limited binding capacity for $NH_4^+$, ZP has had to be employed in relatively great quantities and has even been shown to remove serum potassium, calcium, and magnesium during microencapsulation treatment. Removing potassium and calcium from patients is detrimental because (1) potassium is needed by the patient for proper sodium/potassium balance and (2) calcium loss is increased in uremic patients due to accumulated phosphate ion concentration. This leads to bone decalcification, a serious problem for uremic patients. See Kjellstrand, supra. Also, a large volume of ZP/urease capsules needs to be ingested by the patient because of low-binding capacity for ammonia and the low specificity for ammonium ions of the ZP material. The need to take such large quantities of this material may lead to stomach upset and the patient's refusal to adhere to this therapy regimen.

The great expense of manufacturing ZP, poor availability worldwide, and its nonspecificity have long been criticized in its use for the treatment of uremia. Notwithstanding numerous investigational studies attempting to obtain solutions to exploit alternatives to ZP in disposable cartridges and in the gut as substitute nephrons, including administration of oral sorbent and intestinal perfusion, no practical commercial successor to ZP has been found.

While it is clear that the strategies described in the preceeding background sections were, for their time, attempts to provide improved, lower-cost treatment and improve the clinical course of uremic patients, it is also apparent that the use of ZP in these therapies has limited their ability to reach the goal of better patient health. In order to measurably advance the art, a successor to ZP is needed.

SUMMARY OF THE INVENTION

The present invention relates to a method for producing a particulate substantially water-insoluble magnesium phosphate product, which when slurried has a pH of from about 6.5 to about 8.5, having an empirical composition exclusive of water of hydration of the formula:

$$(Mg)_x(H)_y(PO_4)_z$$

wherein
x is from about 0.75 to about 1.4,
y is from about 0.2 to about 1.5, and
z is 1
comprising the steps of:
(a) mixing magnesium hydroxide with water containing a phosphate ion containing buffer having a pH of from about 6.5 to about 8.5 to form a slurry,
(b) slowly adding $H_3PO_4$ to the slurry of step (a) to form a particulate substantially water-insoluble magnesium phosphate product having an empirical composition exclusive of water of hydration of the formula:

$$(Mg)_x(H)_y(PO_4)_z$$

wherein
x is from about 0.75 to about 1.4,
y is from about 0.2 to about 1.5, and
z is 1; and
(c) separating the magnesium phosphate product from the slurry.

The term "substantially water-insoluble" means that the magnesium phosphate product has a solubility of less than about 70 mg/dl when the product is added to an aqueous solution at a pH of about 4 to about 9.

The phosphate ion-containing buffer is normally an alkali metal phosphate such as sodium phosphate, potassium phosphate, or lithium phosphate. Sodium phosphate is preferred. Any phosphate ion-containing buffer can be used as long as it is capable of providing phosphate ions in an aqueous solution and can provide by itself or by adjustment a pH ranging from about 6.5 to about 8.5. A pH of about 7.4 is preferred.

The phosphate ion-containing buffer may also contain an alkali metal hydroxide to provide for pH range control. Typical alkali metal hydroxides include sodium hydroxide, potassium hydroxide, and lithium hydroxide. Sodium hydroxide is preferred.

Although not absolutely required for a successful practice of the invention, it is also possible to add the phosphate ion-containing buffer having a pH of from about 6.5 to about 8.5 in the second step of the process to assure a control on the pH range. The make-up of the phosphate ion-containing buffer in this step may be the same as the make-up in the first step and again the preferred pH is 7.4.

The $H_3PO_4$ must be slowly added in the second step of the process since the reaction is highly exothermic and the reaction temperature should be kept under control. This is best achieved by removing heat from the reaction vessel and this can be accomplished by surrounding the reaction vessel with a water bath.

The process of the present invention is especially useful in forming a magnesium phosphate product where x and y are both 1.0.

After separation of the magnesium phosphate product from the slurry, the product is normally dried at a temperature of about 50° C. to about 55° C. Drying is usually carried out overnight.

The magnesium phosphate product of the present invention is a useful alternative to ZP in removing urea, actually ammonium ions, from body fluids.

It has been discovered that under equilibrium conditions only about six (6) grams of the magnesium phosphate product is required per gram of hydrolyzed urea. This is far superior to traditional zirconium phosphate (ZP) reagents, which reagents require about 17 to 20 grams of ZP per gram of hydrolyzed urea to be removed, even when ZP is tested under almost ideal conditions not involving other conditions always present in practical applications. The magnesium phosphate product is believed to treat patient urea in the following way:

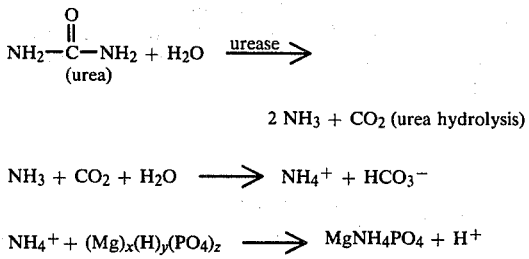

$$NH_3 + CO_2 + H_2O \longrightarrow NH_4^+ + HCO_3^- \quad (2)$$

$$NH_4^+ + (Mg)_x(H)_y(PO_4)_z \longrightarrow MgNH_4PO_4 + H^+ \quad (3)$$

In summary, urea and water liberate ammonium ions ($NH_4^+$), and the magnesium phosphate product consumes the ammonium ions.

In addition, the magnesium phosphate product is believed to have the advantage of reacting chemically with the ammonia as opposed to less specific ion exchange as is traditionally criticized with the use of zirconium phosphate. Use of the magnesium phosphate product would, therefore, lead to the advantage of avoiding magnesium and potassium absorbance from the patient as is the case with zirconium phosphate. Further, the magnesium phosphate product, unlike zirconium phosphate, does not release any sodium ions back into the dialysate solution, or when employed in encapsulated product, back into the patient.

A method for treating a solution containing ammonium ions has also been found, comprising contacting the solution with an ammonium-removing effective amount of the particulate substantially water-insoluble magnesium phosphate product of the fore-mentioned empirical formula.

Urea is normally present in the intestinal contents in the concentration of 40 to 60 mg/dl, and it is recommended that the magnesium phosphate product be utilized in amounts roughly one third that of the traditional zirconium phosphate for removal of the hydrolysis product $NH_4^+$ from urea.

Other applications for the magnesium phosphate product made in accordance with the present invention include use for sewage waste water treatment and process water effluents. After such treatments, the resulting $MgNH_4PO_4$ may be removed and used as a fertilizer.

The following examples are representative of the invention

EXAMPLE 1

In a 5 liter round bottom flask, 200 g of magnesium hydroxide (U.S.P. powder, Mallinckrodt 5984) was slurried with a variable speed stirrer in approximately 2 liters of 0.12N phosphate buffer (pH 7.4; 8.3 g/l sodium phosphate monobasic and sodium hydroxide). The flask was immersed in a large volume room temperature water bath to aid in controlling the temperature of the exothermic reaction. While the magnesium hydroxide slurry was vigorously stirred, 292 g of $H_3PO_4$ (85%; MCB 100-5) diluted with about 2 liters of 0.12N phosphate buffer (pH 7.4) was pumped into the flask at a rate of about 30 ml/min. Both temperature and pH were monitored throughout the reaction. After the temperature of the slurry re-equilibrated to room temperature and the pH restabilized at 7.4 (a period of about one to two hours), the slurry was decant washed four times with 2 liters of deionized water, filtered, and rinsed with 12 liters of deionized water. The resulting wet cake magnesium phosphate product was then spread on trays and dried overnight to free flowing in a 50° C. dehumidified forced air cabinet. The percent moisture normally ranged from 30% to 40%.

EXAMPLES 2 TO 10

A number of magnesium phosphate products produced in accordance with the present invention were tested for ammonia-nitrogen capacity on both a wet and a dry basis. The results appear below which also include values of the percentage yield as dibasic magnesium phosphate ($MgHPO_4$) and percentage moisture.

| Example No. | Ammonia-Nitrogen Capacity[+] | | % Yield as $MgHPO_4$ | % Moisture |
|---|---|---|---|---|
| | Wet | Dry | | |
| 2 | 52 | 89 | 67.6 | 41.4 |
| 3 | 58 | 88 | 65.4 | 34.2 |
| 4 | 54 | 90 | 63.0 | 40.4 |
| 5 | 50 | 93 | 63.0 | 46.5 |
| 6 | 55 | 76 | 87.0 | 28.2 |
| 7 | 60 | 103 | 52.9 | 42.3 |
| 8 | 51 | 87 | 73.7 | 41.3 |
| 9 | 55 | 94 | 81.9 | 41.3 |
| 10 | 59 | 83 | 66.8 | 28.2 |

[+]measured in terms of mg nitrogen/g magnesium phosphate product

What is claimed is:

1. A method for the preparation of a particulate substantially water-insoluble magnesium phosphate product which when slurried has a pH of from about 6.5 to about 8.5, having an empirical composition exclusive of water of hydration of the formula:

$$(Mg)_x(H)_y(PO_4)_z$$

wherein
x is from about 0.75 to about 1.4,
y is from about 0.2 to about 1.5, and
z is 1
comprising the steps of
(a) mixing magnesium hydroxide with water containing a phosphate ion-containing buffer having pH of from about 6.5 to about 8.5 to form a slurry;
(b) slowly adding $H_3PO_4$ to the slurry of step (a) to form a particulate substantially water-insoluble magnesium phosphate product having an empirical composition exclusive of water of hydration of the formula:

$$(Mg)_x(H)_y(PO_4)_z$$

wherein
x is from about 0.75 to about 1.4,
y is from about 0.2 to about 1.5, and
z is 1, and
(c) separating said magnesium phosphate product from said slurry.

2. The method of claim 1 wherein said phosphate ion-containing buffer has a pH of about 7.4.

3. The method of claim 1 wherein said phosphate ion-containing buffer contains an alkali metal phosphate.

4. The method of claim 3 wherein said alkali metal phosphate is sodium phosphate.

5. The method of claim 3 wherein said phosphate ion-containing buffer contains an alkali metal hydroxide.

6. The method of claim 5 wherein said alkali metal hydroxide is sodium hydroxide.

7. The method of claim 1 wherein x and y are 1.0.

8. The method of claim 1 wherein a phosphate ion-containing buffer having a pH of from about 6.5 to about 8.5 is added to the slurry in step (b).

9. The method of claim 8 wherein said phosphate ion-containing buffer added to the slurry in step (b) has a pH of about 7.4.

10. The method of claim 1 wherein step (b) is carried out under stirring.

11. The method of claim 10 wherein step (b) is carried out under agitation.

12. A method for the preparation of a particulate substantially water-insoluble magnesium phosphate product containing slurry having a pH of from about 6.5 to about 8.5, said product having an empirical composition exclusive of water of hydration of the formula:

$$(Mg)_x(H)_y(PO_4)_z$$

wherein
x is from about 0.75 to about 1.4,
y is from about 0.2 to about 1.5, and
z is 1,
comprising the steps of:
(a) mixing magnesium hydroxide with water containing a phosphate ion-containing buffer having a pH of from about 6.5 to about 8.5 to form a slurry, and
(b) slowly adding $H_3PO_4$ to the slurry of step (a) to form a particulate substantially water-insoluble magnesium phosphate product having an empirical composition exclusive of water of hydration of the formula:

$$(Mg)_x(H)_y(PO_4)_z$$

wherein
x is from about 0.75 to about 1.4,
y is from about 0.2 to about 1.5, and
z is 1.

13. The method of claim 12 wherein x and y are 1.0.

14. The method of claim 12 wherein said phosphate ion-containing buffer has a pH of about 7.4.

15. The method of claim 12 wherein said phosphate-ion containing buffer contains an alkali metal phosphate.

16. The method of claim 15 wherein said alkali metal phosphate is sodium phosphate.

17. The method of claim 15 wherein said phosphate ion-containing buffer contains an alkali metal hydroxide.

18. The method of claim 17 wherein said alkali metal hydroxide is sodium hydroxide.

* * * * *